(12) United States Patent
Aldrich et al.

(10) Patent No.: US 9,164,733 B1
(45) Date of Patent: Oct. 20, 2015

(54) COVERAGE ANALYSIS FOR VARIABLE SIZE SIGNALS

(71) Applicant: THE MATHWORKS, INC., Natick, MA (US)

(72) Inventors: William J. Aldrich, Natick, MA (US); Olga Voronina, Lexington, MA (US); Zsolt Kalmar, Shrewsbury, MA (US)

(73) Assignee: The MathWorks, Inc., Natick, MA (US)

( * ) Notice: Subject to any disclaimer, the term of this patent is extended or adjusted under 35 U.S.C. 154(b) by 290 days.

(21) Appl. No.: 13/780,845

(22) Filed: Feb. 28, 2013

Related U.S. Application Data

(62) Division of application No. 12/475,215, filed on May 29, 2009, now Pat. No. 8,522,215.

(60) Provisional application No. 61/080,578, filed on Jul. 14, 2008.

(51) Int. Cl.
G06F 9/44 (2006.01)
G06F 9/445 (2006.01)
G06F 11/34 (2006.01)
G06F 11/36 (2006.01)

(52) U.S. Cl.
CPC .............. *G06F 8/10* (2013.01); *G06F 9/44589* (2013.01); *G06F 11/3688* (2013.01); *G06F 11/3466* (2013.01); *G06F 11/3664* (2013.01)

(58) Field of Classification Search
None
See application file for complete search history.

(56) References Cited

U.S. PATENT DOCUMENTS

| | | |
|---|---|---|
| 5,604,895 A | 2/1997 | Raimi |
| 6,141,630 A | 10/2000 | McNamara et al. |
| 6,240,376 B1 | 5/2001 | Raynaud et al. |
| 6,662,357 B1 | 12/2003 | Bowman-Amuah |
| 6,804,634 B1 | 10/2004 | Holzmann et al. |
| 6,968,286 B1 | 11/2005 | Watkins |
| 7,886,272 B1 * | 2/2011 | Episkopos et al. ............ 717/124 |
| 8,346,526 B1 * | 1/2013 | Portal et al. ..................... 703/13 |
| 2003/0093716 A1 * | 5/2003 | Farchi et al. .................... 714/34 |
| 2004/0128661 A1 * | 7/2004 | Ghosh et al. .................. 717/159 |
| 2005/0160321 A1 | 7/2005 | Cleaveland et al. |
| 2005/0165793 A1 | 7/2005 | Mosterman |
| 2006/0010429 A1 | 1/2006 | Ihara |
| 2006/0155521 A1 | 7/2006 | Iwashita |
| 2007/0016394 A1 * | 1/2007 | Gaudette ......................... 703/19 |
| 2009/0125290 A1 | 5/2009 | Chatterjee et al. |

OTHER PUBLICATIONS

Co-pending U.S. Appl. No. 12/475,215, filed May 29, 2009, entitled "Coverage Analysis for Variable Size Signals" by William J. Aldrich et al., 65 pages.

\* cited by examiner

*Primary Examiner* — Van Nguyen
*Assistant Examiner* — Tina Huynh
(74) *Attorney, Agent, or Firm* — Harrity & Harrity, LLP

(57) ABSTRACT

An embodiment can include one or more computer-readable media storing executable instructions that when executed on processing logic process variable signals. The media can store one or more instructions for receiving executable code that includes constructs with variable signals for processing the variable signals, and for performing a coverage measurement on the executable code based on information about one or more of the variable signals processed by the executable code. The media can store one or more instructions for producing a coverage result based on the coverage measurement, the coverage result identifying a degree of coverage for the executable code when the executable code processes the variable signals.

20 Claims, 11 Drawing Sheets

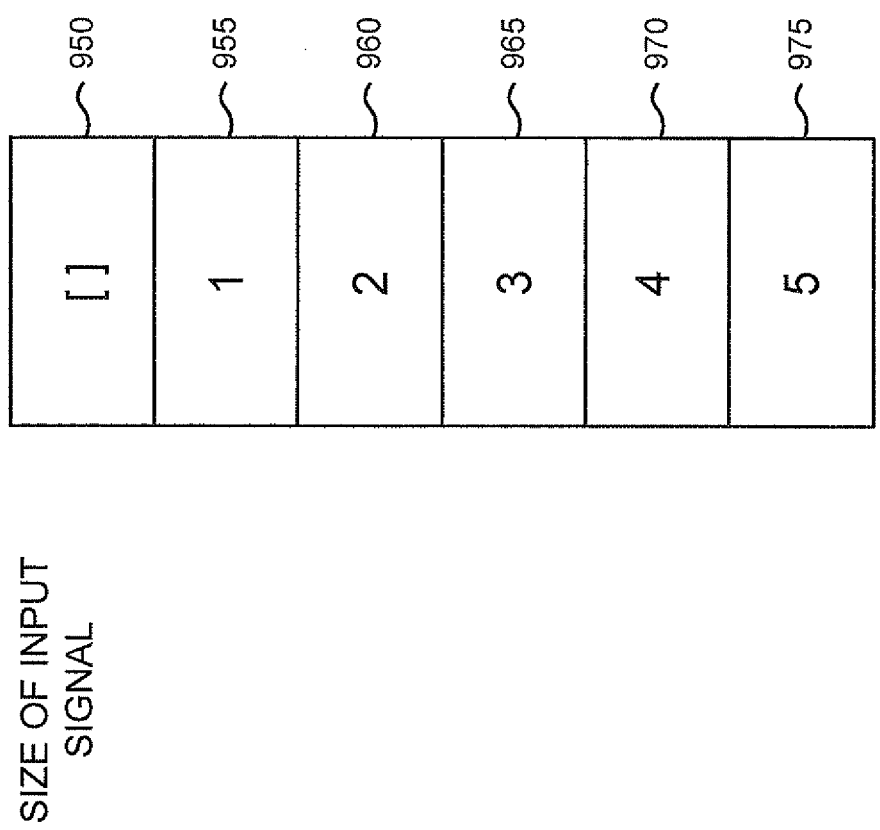

ns signals.

COVERAGE ANALYSIS FOR VARIABLE SIZE SIGNALS

RELATED APPLICATIONS

This application is a divisional of U.S. patent application Ser. No. 12/475,215, filed May 29, 2009, which claims the benefit of U.S. Provisional Patent Application No. 61/080,578, filed Jul. 14, 2008, the contents of which are incorporated by reference herein.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 9B illustrates an example of a signal that can vary in size; and

DETAILED DESCRIPTION

Figure 1:
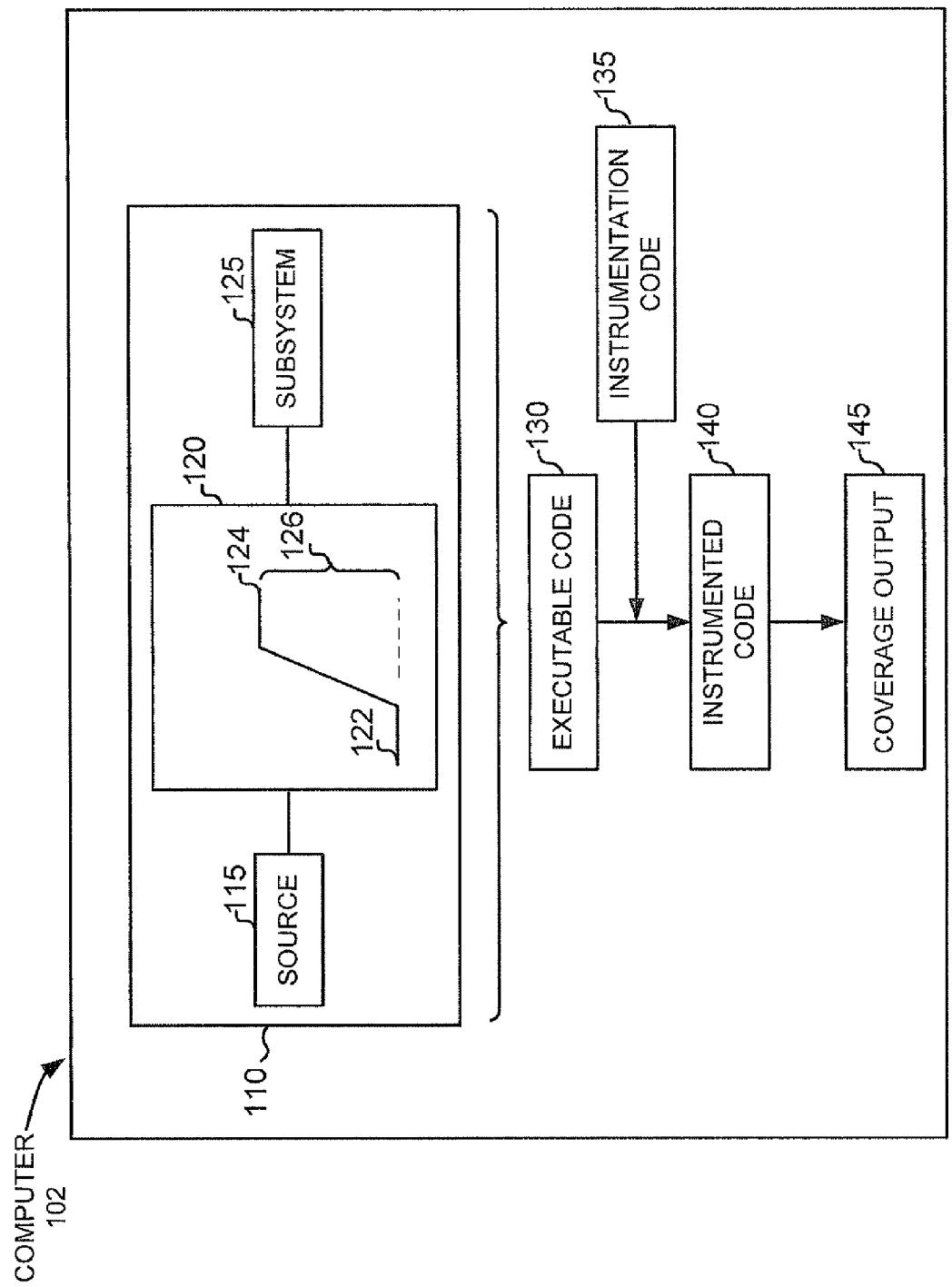
FIG. 1 illustrates an exemplary model that can be used to practice an embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Exemplary embodiments can perform code coverage analysis on executable code that handles variable input data, such as variable size or dimension signals. Signals can be values that are communicated, such as from a source block to a destination block in a graphical model. Exemplary embodiments can further perform coverage analysis of models with variable signals, of code used to implement components of a model (e.g., blocks), to relate model coverage to code and/or to relate code coverage to a model. Embodiments described herein can perform coverage analysis for block diagram models, time-based models, event-based models, state-based models, data flow models, component diagrams, equation based language diagrams, text-based models, etc.

Coverage analysis refers to techniques that indicate the completeness and consistency of a set of requirements. Code coverage and model coverage are two coverage analysis techniques that can be used to perform coverage analysis of programming code or executable models. Code coverage analyzes the way a program executes and provides a measure of completeness of testing based on the code structure of a program being analyzed. Robust code coverage may include statement coverage, decision coverage and/or condition coverage. Modified condition-decision coverage (MC/DC) can be used when more rigorous analysis of conditions in a program are analyzed. MC/DC coverage may imply that each input of a logical expression has been shown to independently change the expression outcome while the other conditions are held constant.

Model coverage analyzes the way a model executes. Model coverage may strive to provide the equivalent information of code coverage in the context of an executable model, such as an executable graphical model, as the model simulates. Model coverage may analyze the control flow within a model and may dynamically update coverage data for components of a model when the objects representing the components are instantiated. Full model coverage may occur when all possible outcomes for components of the model occur. Code coverage and model coverage may use test cases to exercise the code/model when performing coverage analyses. Full code or model coverage may require that test cases cause all possible outcomes of the code or model to occur.

By way of example, a graphical model may include a block that can process input data that varies in size and/or dimension (e.g., along a dimension or by changing the number of dimensions). At one sample time the input data may have dimensions of 2×2 and at another sample time the input data may have dimensions of 3×3, where the block can process the 2×2 input data or the 3×3 input data. As another example, at one sample time the input may have dimensions of 2×2 and at another sample time the input data may have dimensions of 2×2×3, where the block can process the 2×2 input data or the 2×2×3 input data.

In some situations it may be desirable to build excess capacity into the model. For example, it may be determined that likely input signals may have sizes and/or dimensions of 1×1, 2×2 and 3×3. A designer may configure the model to handle signals as large as 4×4 or 5×5 so that the model has excess capacity. As another example, a designer may configure the model to handle signal sizes/dimensions by accounting for the maximum total number of entries in the signal. As such, a signal with dimensions 2×3 may have the same size as a signal with dimensions 3×2. The configured extra capacity may prevent the model from having to be redesigned if a user later decides that it is desirable to run the model with signals that exceed 3×3 but that are less than or equal to 5×5. In some embodiments, signal sizes and/or dimensions may change based on computed values in a model or in executable code produced from a model (e.g., generated code). In addition, a model can be configured to allow signal sizes/dimensions to change as the model executes.

In an embodiment, coverage analysis may be performed. For example, coverage analysis can be performed at a model level (e.g., on semantics of a block) or on executable code (e.g., on executable code for a block in a model). Embodiments may further produce coverage analysis outputs, such as reports, displays, files, etc., that include information that identifies how the model and/or executable code performed against a variable size/dimension input signal. The coverage outputs may be used to reconfigure the model, reconfigure code for the block in the model, reconfigure code generated from the block/model, superimpose coverage information onto the block/model, to link coverage data to elements in the model (e.g., executable blocks in a model), etc.

Exemplary Model

FIG. 1 illustrates an exemplary graphical model that can include a block that processes input data of varying size/dimension. FIG. 1 may include computer 102, graphical model 110, source block 115, saturation block 120, and subsystem 125. Computer 102 may further include executable code 130, instrumentation code 135, instrumented code 140, and coverage output 145. The embodiment of FIG. 1 is illustrative and other embodiments can be configured in other ways. For example, other embodiments may include other blocks of varying type and/or quantity, may include textual modeling code in addition to, or instead of, graphical modeling components (e.g., block 120), may have a different model structure, etc. In an embodiment, an example of a textual model may be a model implemented the MATLAB® programming language by The MathWorks Inc., of Natick Mass.

Computer 102 may include a device that performs processing operations, display operations, communication operations, etc. For example, computer 102 may include logic, such as one or more processing or storage devices, that can be used to perform and/or support processing activities on behalf of a user. Embodiments of computer 102 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or to generate one or more results.

Graphical model 110 may include code that facilitates simulating a physical system. Model 110 may be implemented in an environment executing on computer 102, such as a simulation and modeling environment. Model 110 may include source block 115 that can generate one or more signals having varying sizes and/or dimensions. Source block 115 may be coupled to saturation block 120 and may provide saturation block 120 with input signals that vary. Signals used with exemplary embodiments can be floating point, fixed point, integer, Boolean, enumerations, entity flow, token flow, state transitions, message communications, function calls, triggers, interrupts, assembly connectors, etc. Embodiments of model 110 can include time-based models, state-based models, event-based models, data flow models, etc., without departing from the spirit of the invention.

Saturation block 120 can include code that implements a saturation function, where the saturation function may pass signals that are within a determined range. For example, saturation block 120 may have a range 126 that is defined by a lower limit 122 and an upper limit 124. An input signal received from source block 115 that is between the lower limit 122 and the upper limit 124 may be made available to subsystem 125. In contrast, an input signal that is below the lower limit 122 or that is above the upper limit 124 will be replaced by an output value at either the lower limit or the upper limit, respectively.

Subsystem 125 may include two or more blocks that share a relationship. For example, a signal output from saturation block 120 may be used by multiple down stream blocks to perform one or more operations. It may be desirable to reduce the number of blocks that are visible to a user to make model 110 easier for the user to understand. Subsystem block 125 may simplify model 110 by allowing a user to visually represent a group of blocks using a single icon, such as a subsystem block 125. This subsystem block 125 may, in turn, be considered a primitive block that executes as an atomic unit at a level in an execution hierarchy. In an embodiment, subsystem block 125 may also be for graphical purposes only. i.e., without having execution semantics such as, for example, atomic execution of all or select parts of its content.

Model 110 may be translated into executable code 130. When executable code 130 is executed, functions implemented by model 110 (e.g., functions performed by source block 115, saturation block 120 and/or subsystem block 125) may be performed. In certain situations, it may be desirable to gather information about executable code 130 as the code executes. For example, it may be desirable to determine whether code for saturation block 120 is run against all input signal sizes/dimensions and/or input conditions that are expected, or specified, for model 110. In an embodiment, the executable code may be generated code and can be C code, C++ code, SystemC code, ADA code, Java code, Structured Text, a hardware description language code, such as VHDL, FORTRAN code, Verilog code, a concurrent language code, such as Erlang, etc.

In an embodiment, model 110 may be translated into executable code 130. This executable code 130 can be augmented with additional code that gathers information about executable code 130 while executable code 130 operates, i.e., executes. For example, the additional code (herein referred to as instrumentation code 135) may gather information that determines or indicates whether lower limit 122 was evaluated to determine whether a given input signal was below lower limit 122 and/or whether the input signal was above lower limit 122. In addition, instrumentation code 135 may gather information that determines or indicates whether upper limit 124 was evaluated to determine whether a given input signal was below upper limit 124 or above upper limit 124.

In an embodiment, executable code 130 and instrumentation code 135 may reside in separate data structures (e.g., files). However, in other instances, it may be desirable to combine executable code 130 and instrumentation code 135 into a single file. For example, instrumented code 140 may be produced in situations where executable code 130 is combined with instrumentation code 135. In an embodiment, instrumented code 140 may include executable code 130 that is rewritten to include instrumentation code 135. In this embodiment, instrumentation code 135 may collect information about the performance of executable code 130. For example, executable code 130 can be rewritten to include coverage instrumentation blocks, where the coverage blocks acquire information about how saturation block 120 performs when instrumented code 140 is executed.

When instrumented code 140 is executed, a coverage output 145 may be produced. Coverage output 145 may include information that indicates whether executable code 130 achieved a desired degree of coverage for a sequence of input data. For example, a user may set a code coverage goal of 90% for executable code 130. The user may execute instrumented code 140 and coverage output 145 may indicate whether executable code 130 achieved the coverage goal of 90%. In an embodiment, coverage output 145 may be displayed, stored, or transmitted to a destination.

Example of Instrumented Code

An example is provided below to further illustrate a technique for using instrumented code 140 to perform code coverage recording for executable code 130. Assume that a fragment of C code may be represented as:

```
1 int some_function(int a, int b, int c)
2 {
3     if (a<b) {
4         return(1);
5     } else {
6         return(0);
7     }
8
9 int covData[ ] = {0, 0, 0, 0, 0, 0, 0};
10 void cov_count(int x)
11 {
12     covData[x]++;
13 }
```

Here the expression a<b may be evaluated and when the expression is true, a 1 is returned. Otherwise a 0 may be returned. When coverage analysis is performed on this code fragment, it may be desirable to test both the true condition that produces 1 and the false condition that produces 0. In this example, a coverage point may be the value of the condition a<b, where the condition can be true or false as a program executes. For this example, a possible coverage data structure may be represented as:

```
struct condCovInfo
2 {
3     unsigned int trueCount;
4     unsigned int falseCount;
5 }
```

Here the coverage data structure can be used to record information about the C code fragment, above, as the code fragment executes. The coverage data structure may include an occurrence count that counts the number of times the expression a<b is evaluated true and a separate occurrence count for the number of times the expression has evaluated as false. Here a pair of unsigned integers are used to record the occurrences of whether a<b evaluates as true or false.

When the fragment of C code is instrumented it may be represented as:

```
1 int some_function(int a, int b, int c)
2 {
3     cov_count(3); if (a<b) {
4         cov_count(4); return(1);
5     } else {
6         cov_count(6); return(0);
7     }
8 }
```

Embodiments can support code coverage and/or model coverage. For example, a model may include a block, such as saturation block 120, and coverage values for the block at the model level may differ from coverage values for code that implements the block. At the model level, coverage may only apply to the three regions in which the saturation block operates (above the upper limit, below the lower limit, and between the lower and upper limit). For the code that implements saturation block 120, different coverage may apply. For example, code that implements saturation block 120 may be written in a number of ways, such as:
If (u>ul) then
Else
  If (u<ul) then
  If u>ll then
  Else
  Endif
Endif
or
If (u>ul) then
Endif
If (u<ll) then
End if
If (u<ul && u>ul) then
End if Still other embodiments can express code for a saturation block in still other ways without departing from the spirit of the invention. A code coverage result for one way of expressing the code for saturation block 120 may differ from a code coverage result for code expressed in another way that implements saturation block 120. Reasons for the difference can include, but are not limited to, degrees of nesting for decision points in code, commands used to represents block operations, functions used to represent block operations, conditions that comprise decision points, disjunctive or conjunctive clauses, etc. Exemplary embodiments can perform code coverage at the model level and/or at the level of code used to implement the model.

In the code examples provided above, the instrumentation code does not change the behavior of the original C code fragment. The instrumentation code does, however, add coverage data structures that are updated to indicate the behavior of the coverage points in the code design.

Alternative embodiments may utilize other techniques for acquiring coverage information about executable code without departing from the spirit of the invention.

Exemplary Configuration

Figure 2:
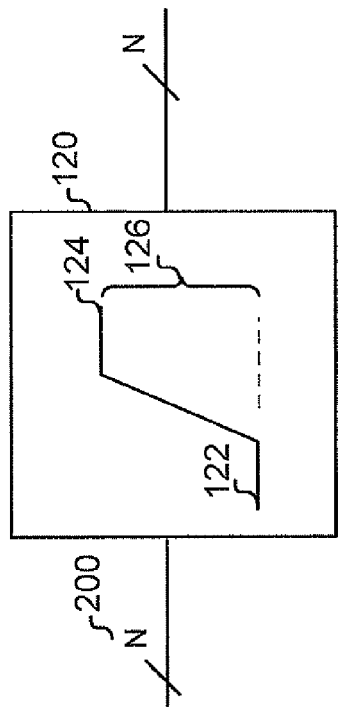
FIG. 2 illustrates an exemplary model component that can receive variable size/dimension signals.

FIG. 2 illustrates an exemplary configuration for saturation block 120 and a sequence of input data 200 that can be used with saturation block 120. In FIG. 2, saturation block 120 may be provided with an input that can take on different sizes and/or values. For example, a signal may have values and dimensions that can vary, e.g., varying over time. Assume that U is a signal that can be input to a block, such as a saturation block, with elements U[i]. U may take on different values, such as where i can be {1, 2, 3 ... n}. In an embodiment, a first value of U, e.g., U[1] may occur at a first sample time in a model and a second value of U, e.g., U[2] may occur at a second sample time in the model. The signal U may also have dimensions that can vary for respective values of the signal. For example, U may have dimensions that can vary from 0 to D, which may be a possible d-tuple.

Referring to FIG. 2, saturation block 120 may be executed at a certain rate, e.g., a sample rate. For each sample time, the size and/or dimension of an input signal, denoted as N, may vary from a lower bound to an upper bound. For example, the value of N may have a static upper bound of 5, and N may be allowed to have values from 1 to the upper bound, namely 5. Here N may take on the values of 1, 2, 3, 4, or 5 as shown in 210. The value of N may be a tuple. Embodiments can also represent signals using an indicator for size and one for a dimension of a signal. For example, a signal with a size of 12 may have dimensions of 2×6 or 2×2×3.

Saturation block 120 may have values associated with upper limit 124 (UL 124) and/or lower limit 122 (LL 122). In FIG. 2, UL 124 may be assigned a value of 3 (element 220 in FIG. 2) and LL 122 may be assigned a value of 0 (element 230 in FIG. 2). Saturation block 120 may make an input value corresponding to N available at its output when N is within a determined range (e.g., range 126), namely between 0 and 3.

In an embodiment, values and other information related to saturation block 120 may be stored in a computer-readable data structure 250.

When saturation block 120 is tested, testing may need to be performed at several coverage points 240. By way of example, for each value of N, such as N=1, several determinations may need to be performed. For example, the determination may evaluate whether:

U(N) is less than the upper limit (U(N)<UL 124),
U(N) is greater than the upper limit (U(N)>UL 124),
U(N) is less than the lower limit (U(N)<LL 122), or
U(N) is greater than the lower limit (U(N)>LL 122).

Therefore, for each value of N, four coverage points may need to be tested. Phrased another way, for an input signal V that can have one or more elements, referred to using i, where i=1 . . . N, coverage points in the above example can be:

V(i)<UL
V(i)>UL
V(i)>LL
V(i)<LL.

In this example, the number of coverage points can vary during coverage analysis and the value of the signal may be tested against these coverage points.

When model coverage analyses are performed with respect to saturation block 120, 100% coverage may be obtained when all four determinations are made for each value of N. Acceptable coverage scores may vary depending on how code for model 110 will be used. For example, when model 110 will be used for a noncritical application, coverage scores below 100 percent may be acceptable, e.g., a coverage score of 60% may be acceptable. In contrast, for critical applications, such as safety critical applications, a coverage score below 100% may be unacceptable.

Under ideal circumstances, all elements in N may be tested against all possible coverage points 240 so that coverage results for saturation block 120 will be 100%. However, in some situations it may not be practical to test all possible values of N with respect to model 110. For example, instrumented code 140 may use large amounts of memory to store coverage information, which may impede efficient collection of coverage data. Moreover, running model 110 numerous times against each possible value of all elements in N, and confirming that all coverage points are tested may be very time consuming and/or expensive, which may further discourage complete code testing.

In situations where performing complete code coverage testing is not practical, exemplary embodiments may allow instrumented code 140 to be tested against a subset of possible values for N. That is, for a given range of input values that model 110 can handle, model 110 will be tested using a subset of the entire range of input sizes and/or dimensions.

Variable Input Data

Figure 3:
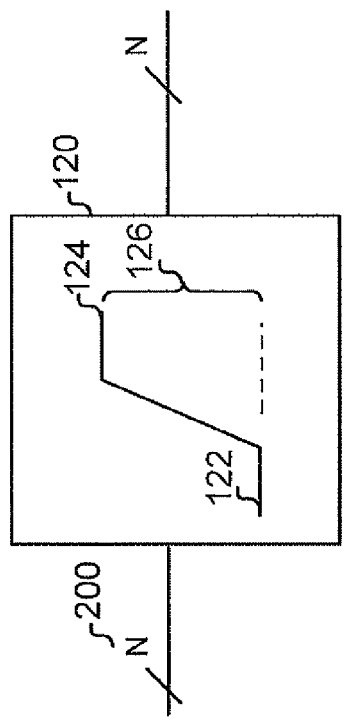
FIG. 3 illustrates the exemplary block of FIG. 2 along with examples of variable size/dimension signals that can be used with the block.

FIG. 3 illustrates an embodiment of saturation block 120 that can accept input data (N). In an embodiment, N may represent an m×n array, where "m" identifies a number of rows and "n" identifies a number of columns for the array. For example:

N may have a number of columns that vary from one sample time to the next (310, FIG. 3):
   e.g., at a first sample time, N may be a 3×1 array and at a second sample time, N may be a 3×2 array;
N may have a number of rows that vary from one sample time to the next (320, FIG. 3)
   e.g., at a first sample time, N may be a 4×1 array and, at a second sample time, N may be a 2×1 array; or
N may have a number of rows and columns that vary from one sample time to the next (330, FIG. 3):
   e.g., at a first sample time, N may be a 2×1 array and, at a second sample time, N may be a 3×2 array.

Other embodiments can include input data (N) having other dimensional arrangements. In fact, exemplary embodiments can be used to perform coverage analysis for executable code or for a model that accepts input data having substantially any number of dimensions (e.g., 0 . . . n−1), where the dimensions can vary from one piece of input data to another piece of input data. In exemplary embodiments, dimensions can vary from one sample time to the next and/or at any moment at which an event occurs (e.g., when a continuous-time signal exceeds a threshold value).

Exemplary Processing

Figure 4:
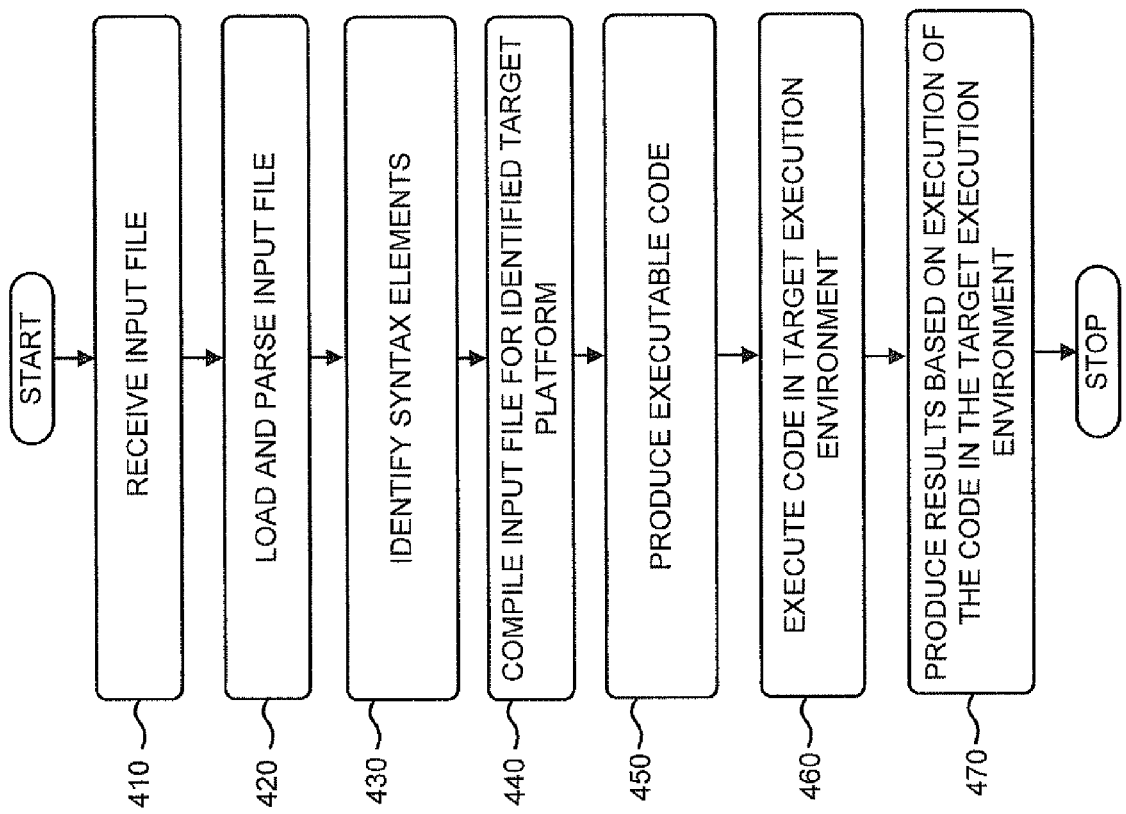
FIG. 4 illustrates a flow chart of exemplary processing that can be used to execute code that processes variable size/dimension signals in a model.

FIG. 4 is a flow chart illustrating exemplary processing acts that can be used in an embodiment. An input file may be received at computer 102 (act 410). For example, an input file that includes model 110 may be received at a workstation. The input file may be loaded and parsed in computer 102 (act 420). The parsed input file may be searched to identify syntax elements in the model (act 430).

The parsed input file may be compiled for an identified target environment, e.g., a particular execution environment (act 440). Execution environments can include, but are not limited to, computer 102, model 110, target environments (e.g., a target device), etc. Examples of target devices can include, but are not limited to, central processing units (CPUs), graphics programming units (GPU), digital signal processors (DSP), application specific integrated circuits (ASICs), field programmable gate arrays (FPGAs), multiprocessor systems on chip (MPSoCs), application specific instruction-set processors (ASIPs), programmable logic devices (PLDs), microelectrical mechanical systems (MEMs), etc.

The compiler of act 440 may produce executable code configured to run on an identified target platform, e.g., a target device (act 450). The executable code may be sent to the target environment and may be executed therein (act 460). For example, the executable code may be copied to a compact disc and loaded from the compact disc into the target environment. Alternatively, the executable code may be downloaded to the target environment over a connection, e.g., a network connection. Target environments can include and/or can operate with other types of environments, such as interpretive simulation environments. An interpretive simulation environment, may be a simulation environment in which instructions for an executable form of a simulation require interpretation through another program. An example of an interpreted simulation environment may be the Simulink® environment from The MathWorks Inc., of Natick Mass.

The executable code may be executed to produce results (act 470). For example, the executable code can be executed on the target device to produce execution results. The execution results can be displayed to a user, used to perform an operation on the target device (e.g., to control a system), stored in a storage media, or transmitted to a destination (e.g., another device).

Figure 5:
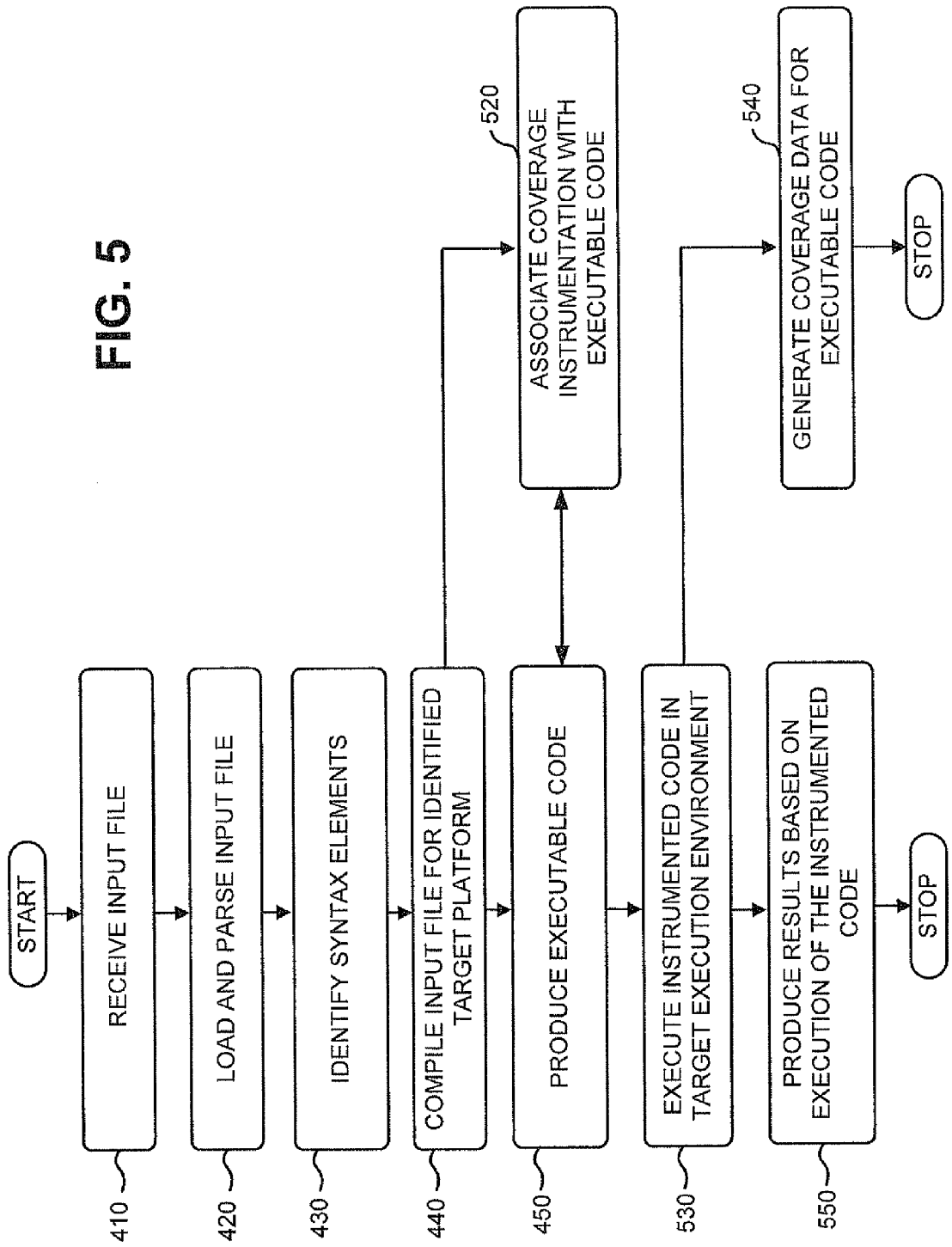
FIG. 5 illustrates a flow chart of exemplary processing that can be used to instrument the code of FIG. 4.

FIG. 5 illustrates processing acts that can be executed to perform coverage analysis. FIG. 5 includes acts 410-450 of FIG. 4, and these acts may be performed as described in connection with FIG. 4 according to an exemplary embodiment. At act 440, coverage analysis logic may be identified. For example, the coverage analysis logic may include mechanisms for performing code coverage measurements or model coverage. Computer 102 may compile the input file for the target environment (act 440).

In an embodiment, coverage analysis logic may include coverage instrumentation that instruments executable code adapted to implement a block in a model and/or that instruments a block in a model at the model level. Embodiments can identify and address discrepancies between code coverage results at the model level and at the code level because coverage instrumentation logic operates at the code and/or the model level. The logic can be configured to perform substantially any type of coverage analysis, including, but not limited to, diagonal, block lower triangular, upper triangular, symmetric, emptiness, etc., analyses. Information from act 440 may be provided to act 520 and executable code may be communicated from act 450 to act 520.

The code coverage instrumentation may be associated with executable code produced at act 450 (act 520). In an embodiment, the output of act 450 may be instrumented code 140 that is configured to execute in the target execution environment. The instrumented code may be executed in the target execution environment (act 530). For example, executing instrumented code 140 in the target environment may include executing application code that performs an operation in the target environment. Executing the instrumented code may produce one or more execution results in the target environment (act 550).

In an embodiment, when instrumented code is executed in act 530, a coverage output 145 (e.g., coverage data) may be generated when instrumented code 140 is executed (act 540). The coverage data may indicate how many coverage points were tested and for what input sizes, dimensions, and/or conditions the coverage points were evaluated. Embodiments may provide coverage data in many ways and/or forms. For example, coverage data can be provided in displayed forms (e.g., on paper, on a display device, etc.), or in machine readable forms (e.g., stored as a file on a computer readable storage medium, transmitted over a wired or wireless link to a destination device, etc.).

In an embodiment, coverage data can be provided to a user in a report. The report may be interactive and may include, for example, links that can be selected using a pointing device. The links may couple the report to a model from which code was generated. For example, a link (e.g., a hyperlink) may be associated with a coverage result for saturation block 120. A user may select the link and saturation block 120 may be displayed to the user within model 110. The user may be able to interact with saturation block 120, input data for saturation block 120, output data for saturation block 120, etc., to allow the user to investigate the operation of model 110. As another example, a link (e.g., a hyperlink) may be associated with the saturation block 120. A user may select the link and the coverage result for the saturation block 120 may be displayed.

Coverage data may be arranged to provide results for an individual model element, e.g., a block, or may be amalgamated into a single result that represents a number of individual coverage results. Coverage data may provide information identifying a portion of a model that was exercised during execution of the model, overheads for the model, heap sizes used by the model, simultaneous occurrences of values, operations, conditions, etc. Coverage data may also be scaled or weighted by, for example, data size, when desired.

The instrumented code may produce an execution result at act 550 that may match an execution result produced at act 470 of FIG. 4. Matching execution results between act 470 and act 550 may indicate that the coverage instrumentation did not adversely impact a deterministic behavior of the application code. In an embodiment, the coverage data may be produced along with the execution result via act 550.

Coverage data and/or execution results can be displayed, stored, processed, or transmitted using computer 102.

Exemplary embodiments may include types of logic that perform additional functions. For example, an embodiment can include initialization logic that is used to setup and/or initialize a model, certain signal sizes/dimensions, etc. The initialization logic may create a data structure, such as a file or a structure in memory (e.g., an array, a list, a struct, a record, a vector, etc.), to store setup/initialization information. When a model is executed with a signal having a first size/dimension a first initialization file, method, or function, etc., may be created. If the signal with the first size/dimension is reused with the model at a later time, the first initialization file, method, or function, etc., may be retrieved from storage and used to configure the model for processing the signal.

Exemplary User Interfaces

Figure 6:
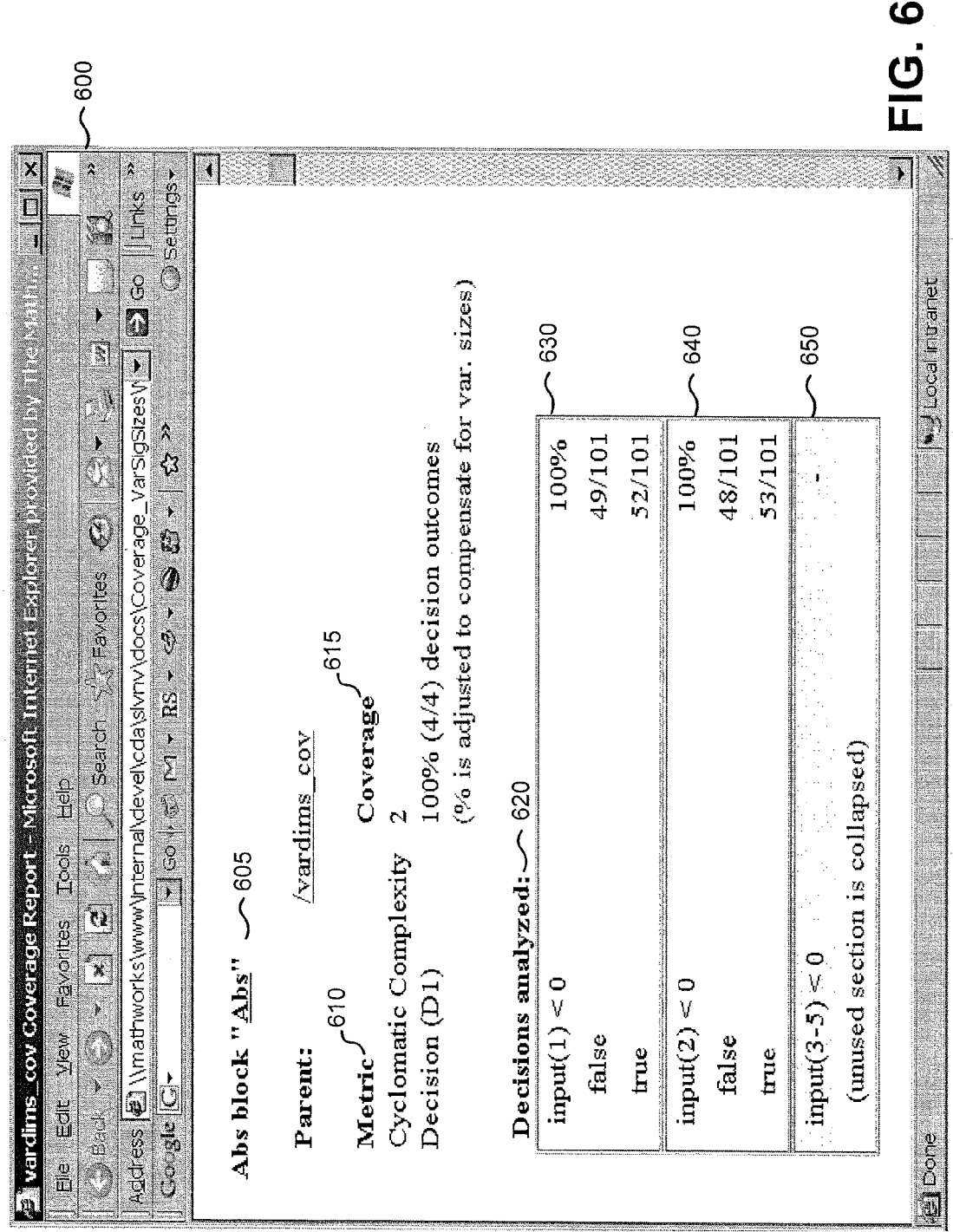
FIGS. 6-8 illustrate exemplary user interfaces that can be used to practice embodiments of the invention described herein.

FIG. 6 illustrates an exemplary user interface that can be used to display coverage data. For example, user interface 600 may be displayed on a display device associated with computer 102. Interface 600 may include a block name field 605 that identifies a graphical modeling block for which coverage data is provided. Interface 600 may further include information about a parent model, parent subsystem, parent block, etc., that may be associated with a block identified in field 605. For example an Abs block may be identified, where the Abs block produces an absolute value of an input signal. Interface 600 may further include metric field 610 and coverage field 615 as illustrated in FIG. 6. Metric field 610 may indicate metrics for which evaluations were performed. Coverage field 615 may include information indicating a degree of coverage for a respective metric in metric field 610.

In an embodiment, interface 600 may include decisions field 620 that can include information about decisions that were evaluated during coverage analysis. For example, a table may be provided in interface 600 that identifies input indices tested (e.g., an index of 1 or 2 for FIG. 6). Embodiments may allow full decision coverage for indices 1 and 2 of FIG. 6. In this implementation, full decision coverage for indices 1 and 2 may mean that a signal size of 2 has been covered but that a size of 1 has not necessarily been covered or that a signal size of 2 has been covered and that a size of 1 has also been covered. The table may further include information about a coverage percentage for a respective input value and/or information that identifies how many times a particular condition was evaluated, or hit, during coverage analysis.

For example (referring to table cell 630 of FIG. 6) for input(1), a condition of input(1)<0 may have been evaluated to determine whether the input(1) was evaluated as false (i.e., input(1) was not less than zero) or as true (i.e., input(1) was less than zero). Since input (1) was evaluated to be both true and false its coverage analysis percentage may be 100%. Table cell 630 may further include information that identifies how many times the test for an input value evaluated as false or true.

Referring now to table cell 640 of FIG. 6, coverage analysis may be performed for input(2), i.e., an index of 2 for the input signal. Since input(2) was evaluated to be both true and false, its coverage analysis percentage may be 100%. In the example of FIG. 6, the input indices could have been 3, 4, and 5 in addition to those tested, namely 1 and 2 (as noted in cell 650 of FIG. 6). However, in the testing performed for FIG. 6, input indices of 3, 4, and 5 were not tested. If the untested indices of 3, 4 and 5 were factored into the coverage analysis as 0%, respectively, coverage analysis results for the Abs block would change.

For example, factoring coverage analysis results in for indices of 3, 4, and 5 would have produced the following coverage results: 100% for input(1), 100% for input(2), 0% for input(3), 0% for input(4) and 0% for input(5). Adding these percentages together would have lowered the overall coverage analysis percentage from 100% to 40%. A coverage of 40% may indicate that coverage analysis for Abs block was unacceptably low (e.g., a coverage of 40%), when in fact the coverage analysis was 100% for the input sizes that were actually tested (namely input indices of 1 and 2).

Exemplary embodiments can prevent distorted coverage analysis results by ignoring, or not factoring in, untested input indices with respect to coverage analysis results. Exemplary embodiments may further hide or obscure information related to untested input indices/sizes. For example, information about untested input indices/sizes may be hidden from a user so that the user is not distracted by coverage results for the untested input indices/sizes and/or conditions.

Referring to FIG. 6, input indices 3, 4 and 5 can be collapsed together and identified as not having been tested. The untested input indices can further be identified using shading, coloring, fonts that differ from other fonts used in interface 600, etc. In FIG. 6, table cell 650 identifies a portion of the table that includes collapsed information related to untested input indices.

Embodiments, such as the one illustrated in FIG. 6, can be used to support other types of analyses and/or operations. For example, interface 600 can maintain and/or display occurrence counts for tested conditions of a variable size signal. For example, cell 630 indicates that the false condition occurred 49 times while the true condition occurred 52 times. Interface 600 may also keep track of the coverage per size of the dimension when desired. Information displayed in interface 600 can be used to support operations, such as coverage guided optimization.

By way of example, referring to FIG. 6, a user may determine that input indices of 1 and 2 are used with the Abs block, while indices of 3, 4 and 5 are not used. Code for a model that includes the Abs block may be configured to handle input indices up to 5 so the model may allocate memory for an input signal of 5 when, in fact, only a signal index up to 2 is used. The user may be able to regenerate code for the model based on the coverage data displayed in interface 600. Embodiments may further allow optimized code to be automatically generated in response to the coverage report. The regenerated code may be optimized to allow the model to handle input signal indices of 1 and 2. As a result of regenerating code for the model, less memory may be required as compared to what was needed for the model before regenerating the code. Other embodiments may allow other techniques to be used for reconfiguring a model or source code based on coverage results.

Exemplary embodiments, such as the one illustrated in FIG. 6, can be used to superimpose coverage results onto a model or source code for which the coverage results were generated. Superimposing coverage results onto a model may allow a user to quickly identify a portion of the model or source code that produced a certain coverage result. Embodiments may further allow models and/or source code to be annotated based on coverage results.

Embodiments can further record minimum and maximum signals sizes and/or dimensions that were tested and may list a maximum allocated size/dimension proximate to the minimum/maximum sizes/dimensions to allow a user to determine an amount of excess capacity in a model or source code. Embodiments may still further keep track of a number of elements in a signal having a varying size/dimension and on operations performed on the elements. For example, a coverage result may indicate that certain elements in a signal had certain mathematical or logical operations performed on them when a model was executed. Still other embodiments may perform operations across stored instances of coverage data. For example, an embodiment can determine operating trends for a model based on comparing archived instances of coverage data that represent different configurations of the model.

Figure 7:
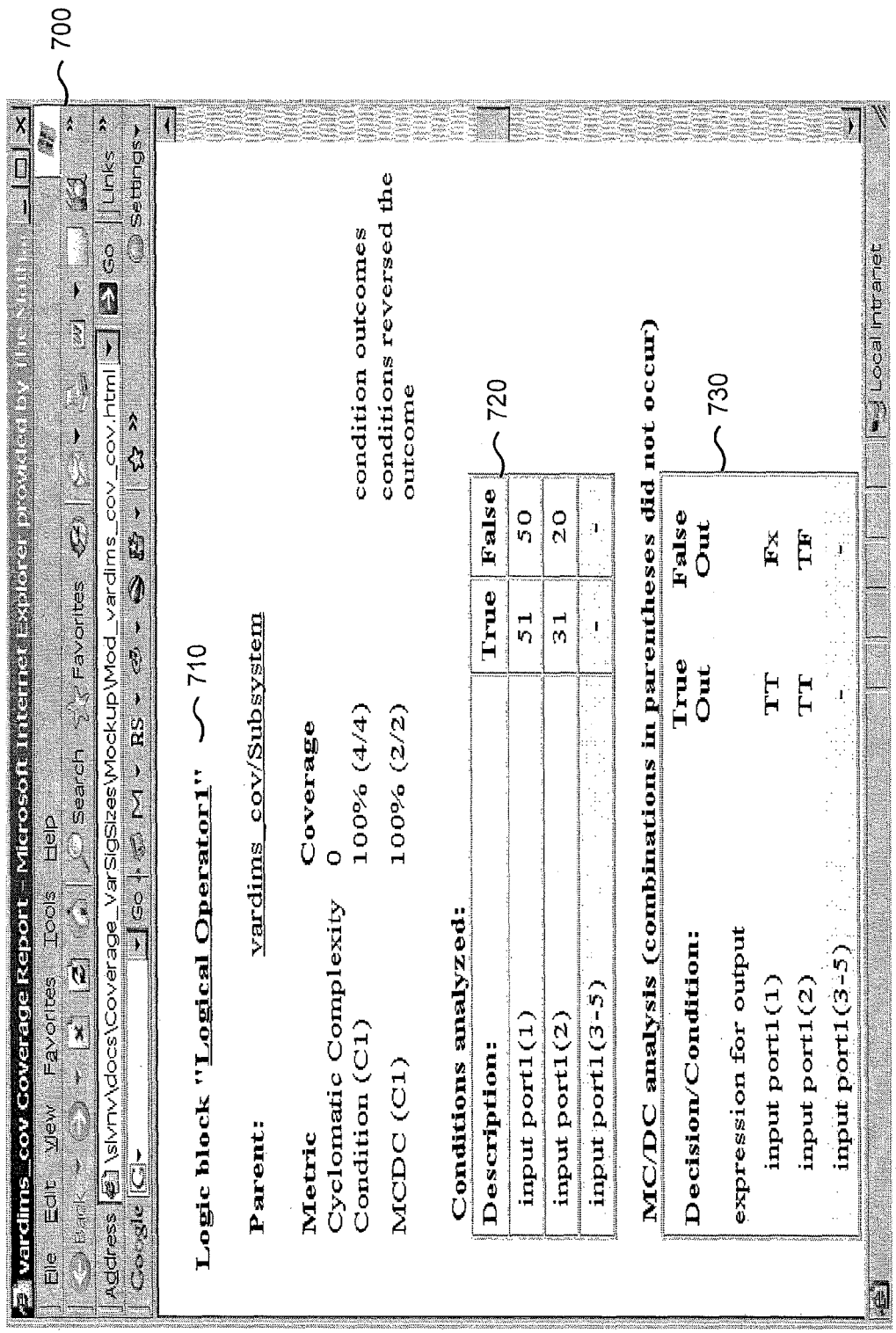

FIG. 7 illustrates an alternative implementation of a user interface that can be used to display coverage analysis information. Interface 700 may include a block field 710 that identifies a block for which coverage analysis information is provided. Interface 700 may include table 720 that can identify tested input signals and/or conditions and untested input signals and/or conditions. Table 720 can further include information about a number of times that a particular condition occurred for a given input signal. For example, input port 1(1) may have evaluated as true 51 times and may have evaluated as false 50 times.

Interface 700 may also include table 730 that can include information associated with, for example, modified condition decision coverage (MC/DC). MC/DC can refer to a coverage measurement that indicates whether a condition independently changes decision outcome. Branch coverage and predicate coverage are other types of decision coverage that can be used along with MC/DC coverage. In an embodiment, an MC/DC report may be generated and may identify coverage for a test in which occurrences that include changing an individual subcondition within a transition result in a change from true to false of an entire transition trigger expression. By way of example, if a transition executes on the condition [C1 & C2 & C3|C4 & C5], the MC/DC report for that transition shows actual occurrences for each of the five subconditions (C1, C2, C3, C4, C5) in which changing its result from true to false is able to change the result of the entire condition from true to false. In an embodiment, coverage analysis results can be test vectors that may result in MC/DC coverage. Embodiments can perform other types of coverage, such as condition coverage, statement coverage, and cyclomatic complexity.

Figure 8:
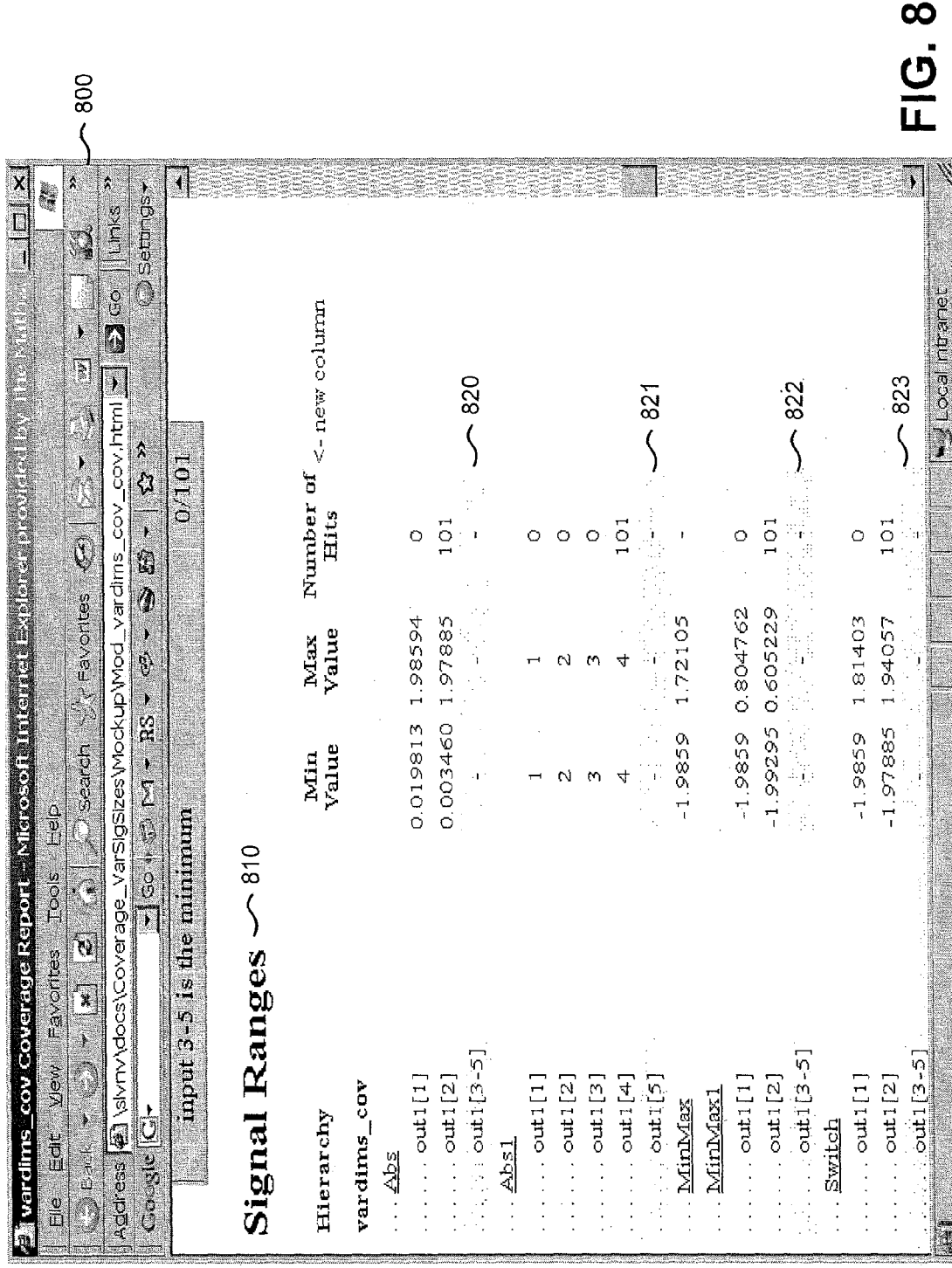

FIG. 8 illustrates an embodiment of a user interface that can be used to display information related to coverage analysis. Interface 800 may include a name field 810 that identifies types of information displayed in the interface. For example, interface 800 may display information about signal ranges and may include coverage analysis for output sizes or dimensions that are produced for a given input signal. For example, interface 800 may include information about minimum sizes/values, maximum sizes/values, and/or a number of hits for respective output sizes/values that are tested. Interface 800 may further collapse information for input sizes/values that were not tested, such as input sizes of 3, 4 and 5 for Abs as indicated by reference number 820, input size of 5 for Abs1 as indicated by reference number 821, input sizes 3-5 for MinMax1 as indicated by reference number 822 and input sizes of 3-5 for Switch as indicated by reference number 823.

Figure 9A:
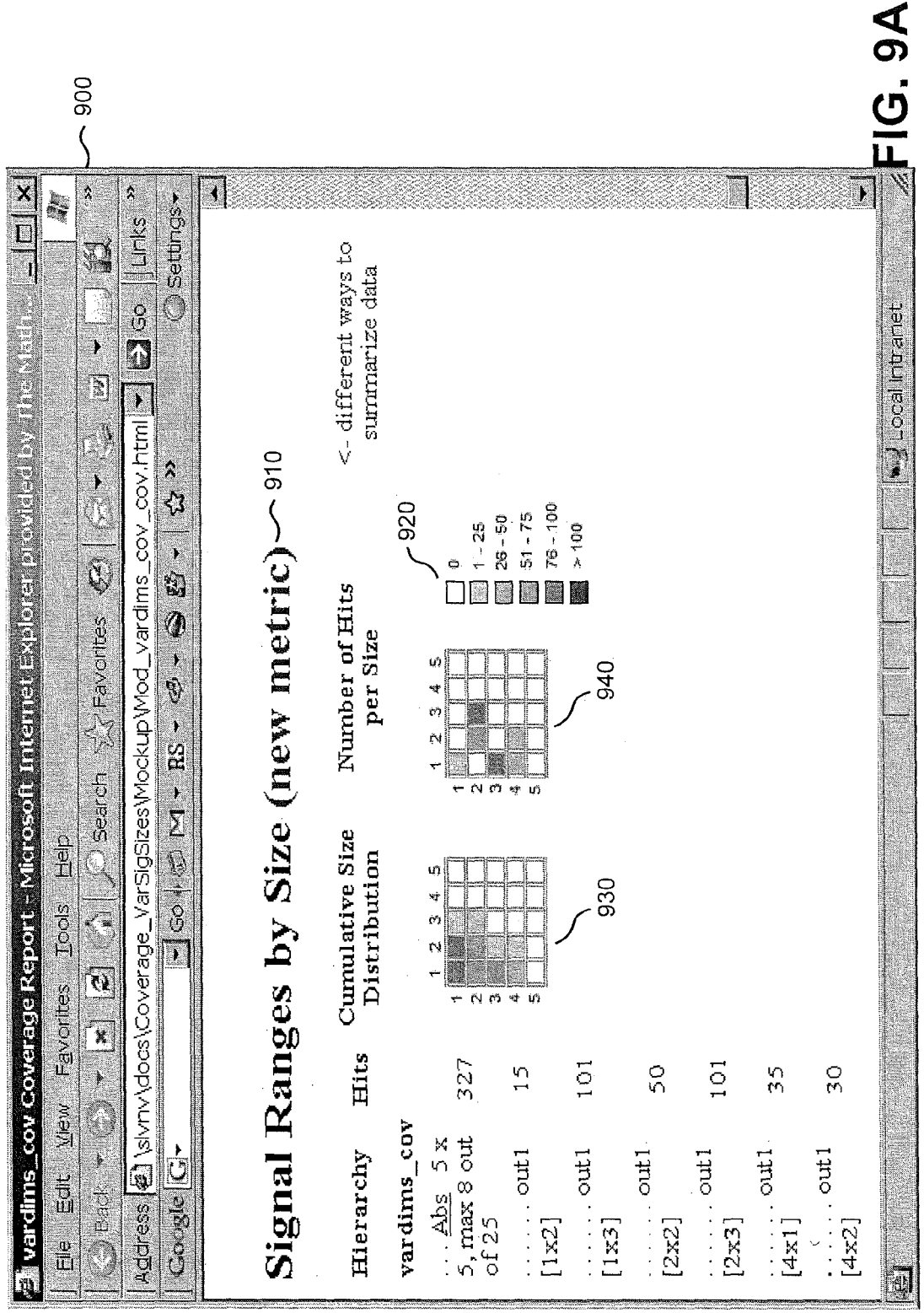
FIG. 9A illustrates an exemplary user interface for displaying information about variable size/dimension signals.

FIG. 9A illustrates an embodiment of a user interface that can be used to display information related to coverage analyses. Interface 900 may include a name field 910 that identifies information that can be displayed elsewhere in interface 900. For example, interface 900 may display information about signal ranges according to size.

In FIG. 9A, a legend 920 may be provided that indicates a number of hits for a particular size of a signal range. Interface 900 may further include a display feature that can identify a cumulative size distribution for respective signal range sizes. Cumulative size distribution may refer to a histogram type of plot that shows a frequency of occurrence of certain total sizes for a total number of signal elements. The cumulative size distribution may be represented as a product of all dimension sizes in an embodiment. Referring to FIG. 9A, information for entries may be aggregated and may appear in the upper left cell of display feature 930. Aggregated information for entries may also be displayed using other techniques, such as by displaying the information in a field, an entry, a pane, a window, etc., of display feature 930. Displayed information may further vary in color, size, font, effect etc. Display feature 930 can provide information to a user in a manner that makes it easy for the user to dynamically display and/or identify results, trends, etc., as testing is performed on a model.

Display feature 940 may include information representing a number of hits for a given dimension of a variable size signal. For example, a signal having a dimension of 5×5 might appear in the lower right corner of display feature 940, while a signal having a dimension of 1×1 might appear in the upper left corner of display feature 940. Display feature 940 may allow a user to quickly determine whether a particular signal dimension has been tested.

As previously discussed, embodiments can be used to test signals having varying dimensions. Embodiments may also be used to test signals that vary in size even when a signal may not vary in dimensions. For example, a signal U may have a size ≤5. For example, for U(i), i may vary between an empty value, e.g., [ ], and 5. In an embodiment, the possible sizes for U(i) may be [ ], 1, 2, 3, 4, 5. FIG. 9B illustrates a possible representation for U when U≤5.

In FIG. 9B, U can take on sizes of empty ([ ]) 950, one (1) 955, two (2) 960, three (3) 965, four (4) 970 and five (5) 975. In some implementation, certain signal sizes may be of particular interest since they may be prone to causing a system to respond in an unexpected manner. For example, a system may not expect input sizes of [ ] 950 or a scalar (e.g., (1) 955). Therefore, when [ ] 950 or (1) 955 are received as input signals, an unexpected processing result may be produced. Embodiments can allow all sizes and/or dimensions of inputs signals to be tested; and, therefore can be used to test uncommon input signal sizes, such as [ ] 950 and (1) 955.

Embodiments of interfaces 600, 700, 800, and 900 can use substantially any technique to display information related to coverage analyses performed on input and/or output data used with executable code and/or models. Embodiments can be configured to separately monitor coverage results for executable code and for a model implemented via the executable code so that differences between the code coverage and model coverage can be detected.

Exemplary Distributed Implementation

Distributed implementations may distribute processing across two or more cores in a single processing device, distribute processing across multiple processing devices installed within a single enclosure, and/or distribute processing across multiple types of processing logic connected by a network.

Figure 10:
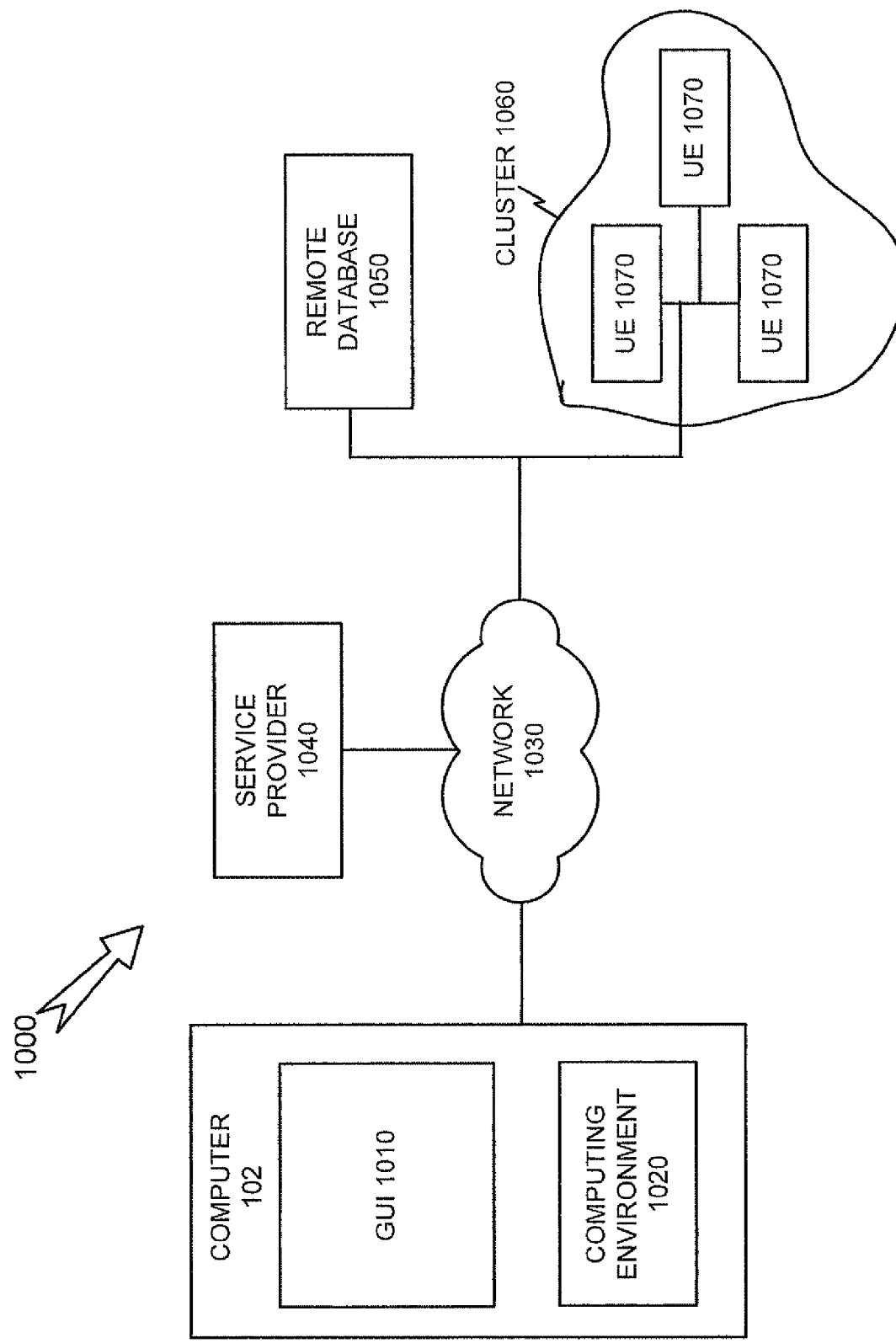
FIG. 10 illustrates an exemplary embodiment for performing distributing processing of variable size/dimension signals.

FIG. 10 illustrates an exemplary system that can perform simulations and/or coverage analyses on behalf of a client using a distributed computing environment. System 1000 may include computer 102, network 1030, service provider 1040, remote database 1050 and cluster 1060. The implementation of FIG. 10 is exemplary and other distributed implementations of the invention may include more devices and/or components, fewer devices and/or components, and/or devices/components in configurations that differ from the exemplary configuration of FIG. 10.

Computer 102 may include graphical user interface (GUI) 1010 and computing environment 1020. GUI 1010 may include an interface that allows a user to interact with computer 102 and/or remote devices (e.g., service provider 1040). In an exemplary embodiment, GUI 1010 may be similar to the interfaces of FIG. 6, 7, 8 or 9A.

Computing environment 1020 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to work exclusively with text-based code in a conventional programming language, such as C++, C, Fortran, Pascal, etc.

Network 1030 may include any network capable of transferring data (e.g., packet data or non-packet data). Implementations of network 1030 may include local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), user datagram protocol (UDP), IEEE 802.10, etc.

Network 1030 may include network devices, such as routers, switches, firewalls, and/or servers (not shown). Network 1030 may be a hardwired network using wired conductors and/or optical fibers and/or may be a wireless network using free-space optical, radio frequency (RF), and/or acoustic transmission paths. In one implementation, network 1030 may be a substantially open public network, such as the Internet. In another implementation, network 1030 may be a more restricted network, such as a corporate virtual network. Implementations of networks and/or devices operating on networks described herein are not limited to any particular data type, protocol, architecture/configuration, etc. For example, in one embodiment, network 1030 may be a quantum network that uses quantum-compatible networking protocols.

Service provider 1040 may include a device that makes a service available to another device. For example, service provider 1040 may include an entity that provides one or more services to a destination using a server and/or other devices. Services may include instructions that are executed by a destination to perform an operation. Alternatively, a service may include instructions that are executed on behalf of a destination to perform an operation on the destination's behalf Assume, for sake of example, that a service provider operates a web server that provides one or more web-based services to a destination, such as computer 102. The web-based services may allow computer 102 to perform distributed simulations of electrical and/or mechanical systems using hardware that is operated by the service provider. For example, a user of computer 102 may be allowed to process signals having varying sizes and/or dimensions using the service provider's hardware. In one implementation, a customer (user) may receive services on a subscription basis. A subscription may include substantially any type of arrangement, such as monthly subscription, a per-use fee, a fee based on an amount of information exchanged between service provider 1040 and the customer, a fee based on a number of processor cycles used by the customer, a fee based on a number of processors used by the customer, etc.

Remote database 1050 may include a device that stores machine-readable information for use by other devices, such as computer 102. In one embodiment, remote database 1050 may include an array or grid of storage devices (e.g., hard disks, optical disks, solid-state storage devices, etc.) that store information about variable size/dimension signals, models used to process variable size/dimension signals, data produced by models, etc.

Cluster 1060 may include a group of processing devices, such as units of execution 1070A, B, and C, that can be used to perform remote processing (e.g., distributed processing, parallel processing, etc.). Units of execution 1070 may include hardware and/or hardware/software based devices that perform processing operations on behalf of a requesting device, such as computer 102. In an embodiment, units of execution 1070A, B, and C may each compute a partial coverage result for a variable size/dimension signal and these partial coverage results can be combined into an overall coverage result for a model.

Embodiments operating in a standalone or in a distributed implementation can perform coverage analyses on code associated with text-based computing and/or modeling applications, such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Embodiments can further perform coverage analyses on code associated with graphical modeling environments, such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; ASCET, CoWare, or aspects of a Unified Modeling Language (UML) or SysML environment.

Examples of Illustrative Embodiments

An embodiment can be implemented using a computer-readable medium storing executable instructions that can be executed on processing logic. When the instructions are executed, variable signals may be processed. For example, variable size or dimension signals can be processed. The instructions can be configured to receive executable code that includes constructs with variable signals where the constructs can be used to process the variable signals. The instructions can also be configured to perform a coverage measurement on the received executable code based on information about at least one of the variable signals. A coverage result can be produced based on the performed coverage measurement, and the coverage result can identify a degree of coverage for the executable code when the executable code processes the variable signals. The embodiment can use executable code that is a graphical or text-based model. Variable signals used with the embodiment may include elements and the coverage results may account for the elements and/or operations performed on the elements. For example, a coverage measurement can iterate over elements of the variable signal before producing a coverage result. Coverage results produced using the embodiment, can reflect one or more changes in size and/or dimension of the variable signal, constructs having a maximum size/dimension, a largest size/dimension of the variable signal that was processed, occurrence counts of dimensionalities of the variable signal, outputs of an interpretive simulation, etc. The embodiment can produce coverage results using instrumentation code that may be separate or intermixed with the executable code.

An embodiment can be implemented using a computer-readable medium that stores executable instructions that can be executed on processing logic. The instructions, when executed, can evaluate coverage for executable generated code. For example, source code may be generated from a model, such as a graphical or textual model. The generated code may include signals having varying sizes and/or dimensions. The generated code may further include instrumentation for performing coverage measurements on the signals. In the embodiment, the generated code may be executed and coverage may be evaluated for the generated code while the code executes. For example, the generated code may be executed on a target device. The evaluating may be performed across a portion of the varying sizes/dimensions of the signals, or the evaluating may be performed across all of the varying sizes/dimensions. The embodiment may produce a coverage result based on the evaluating and/or the executing. The coverage result may indicate whether a particular size/dimension of a signal was executed, how many times the particular size/dimension of the signal was executed, whether a condition associated with the signal was encountered, etc. The coverage result may be used to reconfigure the model from which the code was generated or to reconfigure the generated code itself. For example, an embodiment can reconfigure a model or generated code that was not designed to run in parallel to run in parallel once the model or code is reconfigured. In the embodiment, the varying of the signal may include varying a dimension of the signal, where the signal can include zero or more dimensions. The coverage result may pertain to zero or more of the dimensions of the signal or to information related to the signal, such as an occurrence count of dimensionalities of the signal.

An embodiment can be implemented using a computer-readable medium storing executable instructions that are executed on processing logic. The instructions, when executed, may output coverage information, such as a coverage result, a coverage measurement, etc. The instructions may be configured to receive a coverage result for executable code that includes one or more variable signals. The coverage result may identify elements of the one or more variable signals that were processed using the executable code. Coverage results may ignore coverage measurements associated with signal elements that were not processed by the executable code. Coverage results may be received using the instructions and may be displayed on a graphical user interface. Coverage results may also be outputted using reports, files, or data structures that can be sent to destinations, such as a receiving device or application. Coverage results may be used to reconfigure the executable code, where the reconfiguring may allow, for example, the executable code to interact with a memory more efficiently, or may allow the reconfigured code to execute in a distributed processing environment.

An embodiment can be implemented using a computer-readable medium that stores executable instructions that are executed using processing logic. The instructions, when executed, may use coverage results for a number of executions, such as two or more executions of code. The instructions may be configured to process a first portion of a variable signal, having a first size and/or dimension, using a first execution and to process a second portion of the variable signal, having a second size and/or dimension, using a second execution. The instructions may be configured to determine a first coverage result for the first execution when the first portion is processed and to determine a second coverage result for the second execution when the second portion is processed. In the embodiment, the first execution may occur on a first processing logic or a first thread, and the second execution may occur on a second processing logic or a second thread. The embodiment may have the first execution be a first instance of an execution and the second execution be a second instance of the execution. The embodiment can be configured to merge or combine the first and second coverage results. For example, the first and second coverage results can be aggregated into an overall coverage result, where the overall coverage result indicates a number of times that an element of the variable signals was processed. In the embodiment, executable code operated on by the first and second executions may support a range of sizes and/or dimensions that can determine a minimum or a maximum value for the variable signal. An overall coverage result for the code may indicate an allocated size/dimension used by the variable signal. The overall coverage result can be used to redefine the allocated size/dimension prior to reprocessing the first or second portions. Coverage results for the embodiment can be used to reconfigure executable code prior to generating an updated coverage result. Coverage results can also be test vectors without departing from the spirit of the invention. The test vectors can be aggregated to produce an overall test vector. In an embodiment, aggregating coverage results can include taking the union of everything that was covered during coverage analysis. In other embodiments, other set operations can be performed on coverage results, such as intersection, set differences, etc. Aggregating coverage results can also include processing data in a manner by which a result is representative of the cumulative execution of performed tests. By way of example, two pieces of data may be present that were produced by two tests. The two tests may be combined and coverage results may be produced for the combined tests.

An embodiment can be implemented using a computer-readable media that stores executable instructions. The instructions, when executed, may evaluate coverage for executable code. The medium may store instructions for generating first coverage information for a first execution that is performed using the executable code and a first size of a variable signal. The medium may store instructions for generating second coverage information for a second execution that is performed using the executable code and a second size of the variable signal. The medium may store instructions for identifying a difference between the first and second coverage information, where the difference indicates how the first execution differs from the second execution. The medium can store instructions for reconfiguring the executable code based on the first or second coverage information or based on a difference of the first and second coverage information. The reconfiguring can include modifying a limit for the variable signal in the embodiment. In the embodiment, the first coverage information can be related to an executable element in a model, such as a graphical or textual model, where the element is executed during the first execution.

An embodiment can be implemented using a computer-readable medium storing executable instructions. The instructions, when executed, may reconfigure code. The instructions may be configured to collect signal size information for variable input signals processed by executable code, such as executable code for a model. The instructions may be configured to perform coverage analysis on the executable code for the variable input signals and the coverage analysis may produce a coverage report. The instructions can be configured to reconfigure the executable code based on the coverage results and to re-process one or more of the variable input signals using the reconfigured executable code. The reprocessing can produce an updated coverage result, if desired. The reconfiguring can cause the executable code to use memory more efficiently than the executable code did. The reconfiguring may allow the reconfigured code to execute in a parallel implementation even though the executable code may have been configured to execute in a standalone, non-distributed, manner.

An embodiment can be implemented using a computer-readable medium storing executable instructions. The instructions, when executed, can output coverage information for executable code. The instructions can be configured to identify a portion of a display, such as a pane, window, region, tile, etc., where the pane determines a layout region for outputting coverage information for the executable code. The instructions can be configured to receive coverage information for a variable signal. For example, the signal may have dimensions that vary. In an embodiment, the dimensions can include elements, e.g., entities in an array, a matrix, a vector, etc. The coverage information may indicate whether the variable signal includes a value for one or more of the elements when the executable code operates on the variable signal. The instructions may be configured to format the coverage information within the pane, where the formatting arranges the coverage information in a determined manner, and to output the coverage information within the pane. The coverage information can be outputted in a pattern that is related to the dimensionality of a signal, such as a 2×2 array, or matrix, that includes four elements when a signal has dimensions of 2×2. The pattern can be outputted in the pane and the pane can be displayed to a user via a graphical user interface or via a hardcopy (e.g., paper) output. In the embodiment, the executable code can include a limit that identifies a maximum allowable size and the signal may have dimensions that do not exceed the maximum allowable size. Elements having values of the variable signal may be provided along with elements that do not have values of the variable signal. The outputting may include displaying the elements having values of the variable signal and collapsing elements that do not have values of the variable signal. The embodiment can determine coverage values for elements of the variable signal that include values. The coverage values can be superimposed onto a model when desired. Coverage information, e.g., a coverage result, may include a link, such as a hyperlink, that can allow a user to associate the coverage information with, for example, a model, when the link is selected. The coverage information can include occurrence counts for dimensionalities, and other aspects of the variable signal, that were processed by the executable code. Coverage information may identify a minimum size of the variable signal operated on by the executable code and/or a maximum size of the variable signal. Signals may support different data types such as floating point (e.g., single and double), fixed-point, string, Boolean, integer, enumeration, etc. A model or part of a model may change the data type of a signal depending on information such as what the data type of the input is that it is given. For models, or parts of a model, that support variable data types, coverage of the possible set of data types indicates whether the model, or part of the model, has been executed for which elements in this set. Full coverage may be obtained when the model, or a part of the model, has been executed for each of the elements in the set. The data type of a signal may be fixed during an execution or the data type may be dynamic and change during an execution.

Signals may correspond to a set of function calls from one model part to another. Coverage of the set of function calls may show which function calls in this set have been executed. Full coverage may be obtained if all function calls in the set have been executed.

An embodiment can be configured to allocate an amount of memory for variable signals used by a model based on an expected maximum size of an input signal. This expected maximum size may be automatically derived from analysis of the model or indicated by the user. This allocation may occur in executable code generated from the model. Alternatively, the expected maximum size may be automatically derived from analysis of the code or indicated by the user at the code or model level. In some instances, the actual amount of memory required may exceed the allocated size because of an unanticipated occurrence, such as an input signal exceeding the expected maximum size, etc. When it is determined that allocated memory is inadequate, the embodiment may allocate additional memory, either locally or remotely, to accommodate the larger signal. This allocation may occur in the generated code by a dynamic memory allocation. The user may indicate whether this dynamic memory allocation is undesirable and the code should result in an error or exception. The embodiment, can adapt code and/or model coverage analyses based on the larger signal to provide meaningful code and/or model coverage results. The embodiment may also perform code profiling and may inform a user that an unexpected signal size has been encountered. The embodiment may inform the user regarding changes that need to be made to the model and/or underlying code for the model to allow the model to handle the larger signal size. The embodiment may further identify portions of code and/or the model that may be modified to avoid requiring the larger size signal, e.g., to allow the user to fix erroneous code for the model to avoid the unexpected signal size.

CONCLUSION

Implementations may allow coverage analyses to be performed on signals that vary, e.g., vary in size and/or dimension.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4 and 5, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIG. 1 or 10 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software. The logic may further include software-based instructions that may be stored in one or more computer-readable storage media and may include computer-executable instructions for execution by processing logic, such as a piece of processing logic operating in a workstation.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

The scope of the invention is defined by the claims and their equivalents.

What is claimed is:

1. One or more non-transitory computer-readable media storing instructions, the instructions comprising:
   one or more instructions that, when executed by one or more processors, cause the one or more processors to:
      obtain a coverage result for executable code that contains variable signals,
         the coverage result identifying elements of the variable signals that were processed during an execution of the executable code;
      determine, based on the coverage result, information regarding a size of the variable signals processed during the execution of the executable code;
      modify the executable code based on the information regarding the size of the variable signals processed during the execution of the executable code; and
      process the variable signals during an execution of the modified executable code.

2. The one or more non-transitory computer-readable media of claim 1, where the instructions further comprise:
   one or more instructions that, when executed by the one or more processors cause the one or more processors to output the coverage result via a graphical user interface.

3. The one or more non-transitory computer-readable media of claim 1, where the instructions further comprise:
   one or more instructions that, when executed by the one or more processors cause the one or more processors to:
      generate a report that includes the coverage result; and
      at least one of:
         store the report including the coverage result in a file; or
         store the report including the coverage result in a data structure available to a receiving application,
            where the receiving application operates on the data structure to determine a performance of the executable code related to processing the variable signals.

4. The one or more non-transitory computer-readable media of claim 1, where the instructions further comprise:
   one or more instructions that, when executed by the one or more processors, cause the one or more processors to:
      allocate the modified executable code to execute in a distributed processing environment.

5. The one or more non-transitory computer-readable media of claim 1, where the instructions further comprise:
one or more instructions that, when executed by the one or more processors, cause the one or more processors to:
determine, based on the coverage result, coverage measurements for the elements of the variable signals that were processed during the execution of the executable code; and
determine, based on accounting for the elements of the variable signals, coverage measurements for the elements of the variable signals that were not processed during the execution of the executable code; and
where the one or more instructions to modify the executable code include:
one or more instructions that, when executed by the one or more processors, cause the one or more processors to:
modify the executable code based on the coverage measurements of the elements of the variable signals that were processed during the execution of the executable code and based on the information regarding the size of the variable signals processed during the execution of the executable code.

6. The one or more non-transitory computer-readable media of claim 1,
where the instructions further comprise:
one or more instructions that, when executed by the one or more processors, cause the one or more processors to:
output information that indicates occurrence counts for dimensionalities, of the variable signals, that were processed during the execution of the executable code,
the coverage result including the information about the occurrence counts; and
where the one or more instructions to modify the executable code include:
one or more instructions that, when executed by the one or more processors, cause the one or more processors to:
modify the executable code based on the information that indicates the occurrence counts and based on the information regarding the size of the variable signals processed during the execution of the executable code.

7. The one or more non-transitory computer-readable media of claim 1,
where the variable signals vary in dimension,
where the instructions further comprise:
one or more instructions that, when executed by the one or more processors, cause the one or more processors to:
determine variances in the dimension of the variable signals processed during the execution of the executable code, and
where the one or more instructions to modify the executable code include:
one or more instructions that, when executed by the one or more processors, cause the one or more processors to:
modify the executable code based on the variances in the dimension of the variable signals processed during the execution of the executable code and based on the information regarding the size of the variable signals processed during the execution of the executable code.

8. One or more non-transitory computer-readable media storing instructions, the instructions comprising:
one or more instructions that, when executed by one or more processors, cause the one or more processors to:
obtain coverage information for a variable signal processed during an execution of executable code,
the executable code being associated with information identifying a maximum allowable size for the variable signal, and
the variable signal having dimensions that include elements;
provide one or more values that do not exceed the maximum allowable size for a first set of the elements;
provide one or more values that exceed the maximum allowable size for a second set of the elements;
modify the executable code based on one or more of the first set of the elements or the second set of the elements;
format, after modifying the executable code, the coverage information within a layout region to arrange the coverage information in a determined manner; and
output the formatted coverage information within the layout region,
the formatted coverage information being arranged in the determined manner, and
the one or more instructions to output the formatted coverage information including:
one or more instructions that, when executed by the one or more processors, cause the one or more processors to:
provide, for display, the first set of the elements, and
collapse the second set of the elements.

9. The one or more non-transitory computer-readable media of claim 8, where the one or more instructions to output the formatted coverage information include:
one or more instructions that, when executed by the one or more processors, cause the one or more processors to:
output the formatted coverage information in a pattern that is related to a dimensionality of the variable signal.

10. The one or more non-transitory computer-readable media of claim 9, where the one or more instructions to output the formatted coverage information include:
one or more instructions that, when executed by the one or more processors, cause the one or more processors to:
output the formatted coverage information in a matrix that is related to the dimensionality of the variable signal.

11. The one or more non-transitory computer-readable media of claim 8, where the one or more instructions to modify the executable code include:
one or more instructions that, when executed by the one or more processors, cause the one or more processors to:
determine coverage values for one or more elements, of the elements included in the variable signal, that include a value, and
modify the executable code based on the coverage values and one or more of the first set of elements or the second set of elements.

12. The one or more non-transitory computer-readable media of claim 8,
where the executable code is generated based on a graphical model, and
where the one or more instructions to output the formatted coverage information include:
one or more instructions that, when executed by the one or more processors, cause the one or more processors to:
superimpose the formatted coverage information on the graphical model.

13. The one or more non-transitory computer-readable media of claim 8,
where the executable code is generated based on a graphical model,
where the one or more instructions to output the formatted coverage information include:
one or more instructions that, when executed by the one or more processors, cause the one or more processors to:
provide a link, that when selected, associates the coverage information with a portion of the graphical model, and
where the instructions further comprise:
one or more instructions that, when executed by the one or more processors, cause the one or more processors to:
determine a selection of the link, and
associate the coverage information with the portion of the graphical model based on the selection.

14. A method comprising:
obtaining a coverage result for executable code that contains variable signals,
the coverage result identifying elements of the variable signals that were processed during an execution of the executable code, and
the obtaining the coverage result being performed by a device;
determining, based on the coverage result, information that indicates one or more occurrence counts for one or more dimensions of the variable signals,
the determining the information that indicates the one or more occurrence counts being performed by the device;
modifying the executable code based on the information that indicates the one or more occurrence counts,
the modifying the executable code being performed by the device; and
processing the variable signals based on the modified executable code,
the processing the variable signals being performed by the device.

15. The method of claim 14, where modifying the executable code includes:
modifying the executable code to increase a level of efficiency associated with accessing a memory during an execution of the modified executable code relative to a level of efficiency associated with accessing the memory during the execution of the executable code.

16. The method of claim 14, further comprising:
determining variances in a dimension of the variable signals processed during the execution of the executable code,
where modifying the executable code includes:
modifying the executable code further based on the variances in the dimension of the variable signals processed during the execution of the executable code.

17. The method of claim 14, further comprising:
determining, based on the coverage result, coverage measurements for the elements of the variable signals that were processed during the execution of the executable code; and
determining, based on accounting for the elements of the variable signals, coverage measurements for the elements of the variable signals that were not processed during the execution of the executable code,
where modifying the executable code includes:
modifying the executable code based on the coverage measurements of the elements of the variable signals that were processed during the execution of the executable code.

18. The method of claim 14, further comprising:
generating the executable code based on a graphical model.

19. The method of claim 14, further comprising:
superimposing the coverage result on a graphical model.

20. The method of claim 14, further comprising:
generating a report that includes the coverage result, and
providing the report to a receiving application that determines a performance of the executable code related to processing the variable signals.

\* \* \* \* \*